No. 718,890. PATENTED JAN. 20, 1903.
J. WALTER.
PROCESS OF MAKING SCULPTURAL RELIEFS, &c.
APPLICATION FILED JULY 25, 1902.
NO MODEL.
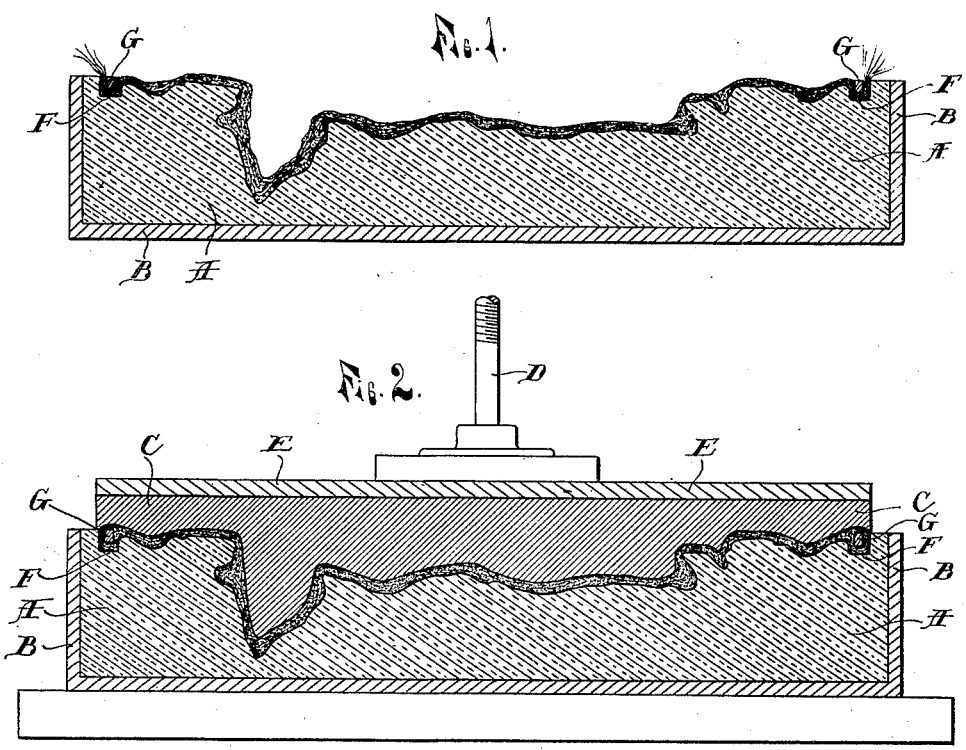
WITNESSES.
INVENTOR.
John Walter
Attorneys.

UNITED STATES PATENT OFFICE.

JOHN WALTER, OF DETROIT, MICHIGAN, ASSIGNOR TO JAMESON MANUFACTURING CO., LIMITED, OF DETROIT, MICHIGAN.

PROCESS OF MAKING SCULPTURAL RELIEFS, &c.

SPECIFICATION forming part of Letters Patent No. 718,890, dated January 20, 1903.

Application filed July 25, 1902. Serial No. 117,040. (No model.)

*To all whom it may concern:*

Be it known that I, JOHN WALTER, a citizen of the United States of America, residing at 1342 Howard street, Detroit, in the county of Wayne and State of Michigan, have invented certain new and useful Improvements in Processes of Making Sculptural Reliefs, Pictorial Advertising-Signs, &c., of which the following is a specification, reference being had therein to the accompanying drawings.

My invention broadly refers to the manufacture of sculptural reliefs by the art of casting or shaping plastic compositions adapted to set or harden in a mold; and my invention has particular reference to the manufacture of pictorial advertising matter in the form of relief pictures.

In the present state of the art a suitable composition adapted to set or harden when dried is poured, in a semiliquid or plastic condition, into the prepared mold, generally a gelatin mold, and the material is distributed in the mold and evenly applied over the face thereof, and after the article has been shaped and has become set it is subjected to artificial heat and thence further subjected to a process of induration by the use of glue or similar material.

The object of my invention is to obviate the necessity of using the composition in a semiliquid or plastic condition, as its use not only soon wears out the mold and effaces the finer details on account of the attendant pressure which is required to shape the articles in the mold, but also to do away with the necessity of the separate step of indurating the article after it is formed.

A further object of my invention is to make the articles lighter and stronger and of greater artistic merit than they can be made in the above-described manner.

My invention consists in a new process and in various novel steps in this process, all as hereinafter more specifically described, and shown in the accompanying drawings, in which—

Figure 1 is a vertical central section through a mold with the liquid and fibrous material in place. Fig. 2 is a similar section through a two-part mold as in use.

As shown in the drawings, A is the lower or intaglio mold, preferably of gelatin or similar material, contained within a case or box B, and C the upper or relief mold, carried by a rod or plunger D, secured to the backing E.

F is a recess, preferably formed around the edge of the mold, into which strips of wood G or other material may be pressed after the fiber has been applied and over which the straggling ends of the fiber are turned in and embedded in the composition to form a smooth reinforced edge, the upper mold then being lowered into place.

In carrying out my new process I may use any of the compositions in present use having wood-pulp as a base, with an admixture of plaster-of-paris and preferably some whiting. In addition to these materials I use also some ground dextrine and mix the whole with sufficient water into a thin paste. This paste is poured into the mold, taking care in pouring to distribute the same as much over the surface as it is possible. Then beginning at the deeper portion, where a surplus of material has accumulated, the operator with his hands gently presses bits of fibrous material—such as loose Manila fiber, lint, or the like—upon the mold and embeds it into the material, and in this way, working toward the shallower portions, the whole surface is gradually covered, and at the same time the material is equally distributed and forms, with the embedded fiber, a mat of uniform thickness over the whole surface. It will be understood that the material alone, not being in a plastic condition, could not be shaped at all, but with the aid of the incorporated fiber, which holds the material by capillary attraction, it is made to cover every part of the surface uniformly, the inclined or vertical portions, as well as the more level portions, and if the shaping has been carefully done the mat follows every detail upon the mold. To prevent the appearance of any ragged edges, the ends of the fibers projecting beyond a marginal straight line are folded back upon the body portion, or, preferably, a marginal edge is first defined by laying strips of wood G around the edges of the mat, and the projecting portions of the mat are then folded back over the strips, so [as to completely embed them. If the mold is suitably recessed to receive these strips, the finished articles will have a raised marginal border and the strips being completely embedded form a stiffening-frame. As soon as the shaping process is completed a top (relief) mold is placed upon the bottom (intaglio) mold and suitable pressure is applied and maintained while the material is allowed to set and harden sufficiently to be taken out and transferred into the drying-oven. Under the influence of the heat of the drying-oven the dextrine incorporated into the composition dissolves in the mass, and when the drying is completed the particles are thoroughly baked together and the article has superior wearing qualities. The dextrine thus not only acts as an indurating material, but it imparts to the composition while in the liquid state a certain pasty condition which holds the particles in intimate suspension in the liquid without making it sticky, and thereby a relatively small quantity of the liquid can be distributed over a large and uneven surface, so that the article can be made of a thickness not exceeding that of strawboard.

My process need not be followed out as a whole, as it will be readily seen that the step of pressing between two molds may be omitted and the article built up wholly in the bottom (intaglio) mold, adding merely enough composition to make the body thick enough to maintain its shape while setting.

Having thus fully described my invention, what I claim is—

1. The process of manufacturing sculptural reliefs from material of the character described, consisting in mixing the material with water into a liquid pouring the same into a mold and then working it into shape by incorporating suitable fibrous material into it in amount and form to cause the material to be uniformly absorbed into the interstices between the fibers and form an inner lining of uniform thickness.

2. The process of manufacturing sculptural reliefs from material of the character described, consisting in mixing the material with water into a liquid, pouring the same into a mold, and then changing the liquid into a plastic form by embedding a fibrous material into it and pressing the fibrous material into contact with the mold and causing it to absorb and evenly distribute the liquid material over the face of the mold.

3. The process of manufacturing sculptural reliefs from composition of the character described consisting of mixing the composition with water into a liquid state pouring it upon a mold, thence incorporating into it fibrous material in amount and form to saturate the fiber with the mixture and produce therewith an even and uniform lining or mat over the face of the mold and thence reinforcing the same along the edges by embedding strips of wood or other suitable material into the marginal portions of the lining.

4. The process of manufacturing sculptural reliefs from cementitious composition, consisting in mixing the composition with water into a liquid state and pouring the same into a mold, thence incorporating into the mixture fibrous material in amount and form to saturate the fiber and produce a uniform lining or mat in contact with the face of the mold, thence applying to the lining a second mold of the reverse character of the first mold and pressing the lining between the two molds.

5. The process of manufacturing sculptural reliefs from cementitious composition, consisting in mixing the composition with water into a liquid state, pouring the same into the mold, incorporating into the mixture fibrous material in amount and form to produce a saturated lining or mat of uniform thickness and pressed into contact with the mold, reinforcing the edges of said mat by embedding strips of suitable material into the marginal portions thereof and thence applying a reverse mold and pressing the article between the two molds till it has become hardened.

6. The herein-described process of making pictorial advertising matter and other sculptural reliefs, which consists in forming a mixture of wood-pulp, plaster-of-paris and dextrine with water to the consistency of thin paste, in shaping the mixture in a mold by applying thereto fibrous material in amount to absorb the mixture into the fibrous material and form therewith a saturated lining or mat of uniform thickness and in contact with the face of the mold, thence applying a second mold of the reverse character and pressing the article between the two molds till the material has set, and thence removing the article and baking it till it has become hard and dry.

In testimony whereof I affix my signature in presence of two witnesses.

JOHN WALTER.

Witnesses:
K. F. F. KURTH,
THOMAS G. LONGSTAFF.